US011749810B2

(12) United States Patent
Yamamoto et al.

(10) Patent No.: US 11,749,810 B2
(45) Date of Patent: Sep. 5, 2023

(54) GAS DIFFUSION LAYER, MEMBRANE ELECTRODE ASSEMBLY, AND FUEL CELL

(71) Applicant: Toray Industries, Inc., Tokyo (JP)

(72) Inventors: Umi Yamamoto, Otsu (JP); Masamichi Utsunomiya, Otsu (JP); Isamu Shigemoto, Otsu (JP); Yasuaki Tanimura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 387 days.

(21) Appl. No.: 17/276,926

(22) PCT Filed: Jun. 28, 2019

(86) PCT No.: PCT/JP2019/025767
§ 371 (c)(1),
(2) Date: Mar. 17, 2021

(87) PCT Pub. No.: WO2020/066191
PCT Pub. Date: Apr. 2, 2020

(65) Prior Publication Data
US 2022/0037674 A1 Feb. 3, 2022

(30) Foreign Application Priority Data
Sep. 28, 2018 (JP) ................................ 2018-183744

(51) Int. Cl.
*H01M 8/10* (2016.01)
*H01M 4/88* (2006.01)
*H01M 8/1004* (2016.01)

(52) U.S. Cl.
CPC ....... *H01M 4/8807* (2013.01); *H01M 8/1004* (2013.01); *H01M 2008/1095* (2013.01)

(58) Field of Classification Search
CPC .. H01M 4/8807; H01M 4/861; H01M 4/8636; H01M 4/8605; H01M 4/1004; H01M 2008/1095
See application file for complete search history.

(56) References Cited

U.S. PATENT DOCUMENTS 8,227,117 B2 * 7/2012 Hampden-Smith .... H01B 1/122 502/182
9,825,304 B2 11/2017 Tatsuno et al.
(Continued)

FOREIGN PATENT DOCUMENTS

JP 2015050073 A 3/2015
JP 2015118944 A 6/2015
(Continued)

OTHER PUBLICATIONS

International Search Report and Written Opinion for International Application No. PCT/JP2019/025767, dated Sep. 17, 2019, 5 pages.

*Primary Examiner* — Raymond Alejandro
(74) *Attorney, Agent, or Firm* — RATNERPRESTIA

(57) ABSTRACT

A gas diffusion layer comprises a carbon sheet and a microporous layer disposed on at least one surface of the carbon sheet, and meeting the requirement "C is equal to or greater than 0", wherein:

C, referred to as "index for simultaneous realization of a required in-plane oxygen permeation coefficient and electrical resistance", is calculated by subtracting the product of B multiplied by 60 from A and adding 310 to the difference, A, is the rate of oxygen permeation in an in-plane direction in a gas diffusion layer that occurs when a pressure of 0.5 MPa is applied in the through-plane direction to a surface of the gas diffusion layer to compress an arbitrarily selected region having a width of 10 mm and a depth of 3 mm in the gas diffusion layer, and (Continued)

B is the "electrical resistance" that occurs when the gas diffusion layer is compressed by applying a pressure of 2 MPa in the through-plane direction.

8 Claims, 2 Drawing Sheets

(56) References Cited

U.S. PATENT DOCUMENTS

| | | | | |
|---|---|---|---|---|
| 9,929,412 | B2 * | 3/2018 | Ueyama | H01M 4/926 |
| 2008/0299431 | A1 * | 12/2008 | Lei | H01M 4/921<br>429/431 |
| 2016/0365582 | A1 | 12/2016 | Kato et al. | |
| 2017/0012291 | A1 | 1/2017 | Tanimura et al. | |
| 2017/0317357 | A1 | 11/2017 | Utsunomiya et al. | |
| 2017/0365862 | A1 * | 12/2017 | Yamasaki | H01M 4/8657 |

FOREIGN PATENT DOCUMENTS

| | | | |
|---|---|---|---|
| JP | 2018014275 | A | 1/2018 |
| WO | 2015125748 | A1 | 8/2015 |
| WO | 2015146706 | A1 | 10/2015 |
| WO | 2016076132 | A1 | 5/2016 |

* cited by examiner

[Fig. 1]
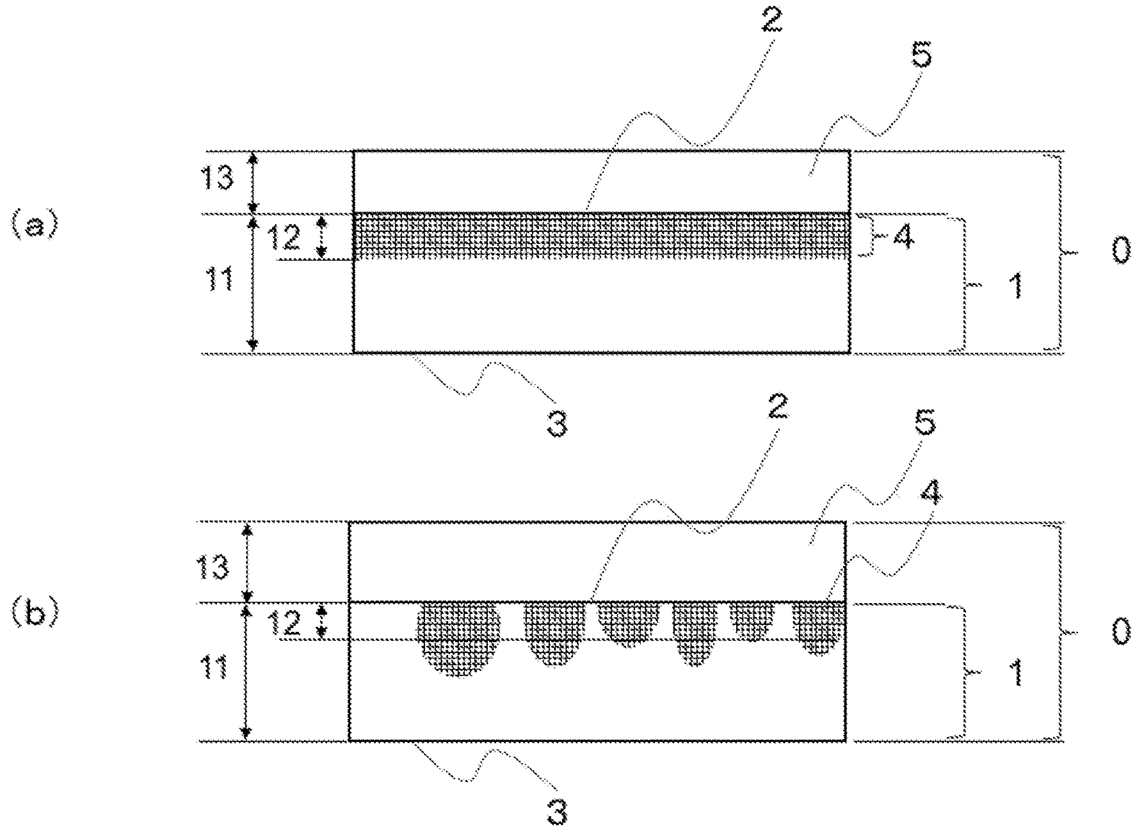

[Fig. 2]
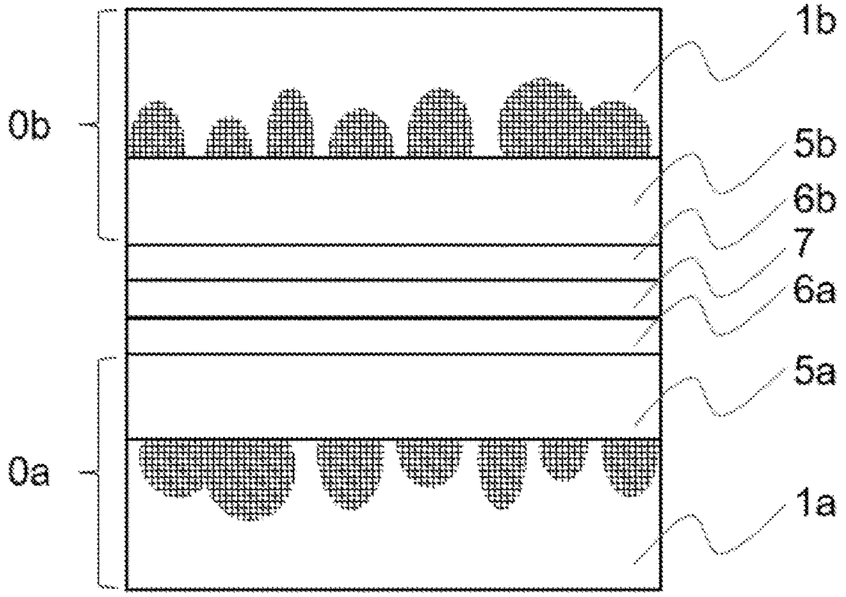
[Fig. 3]
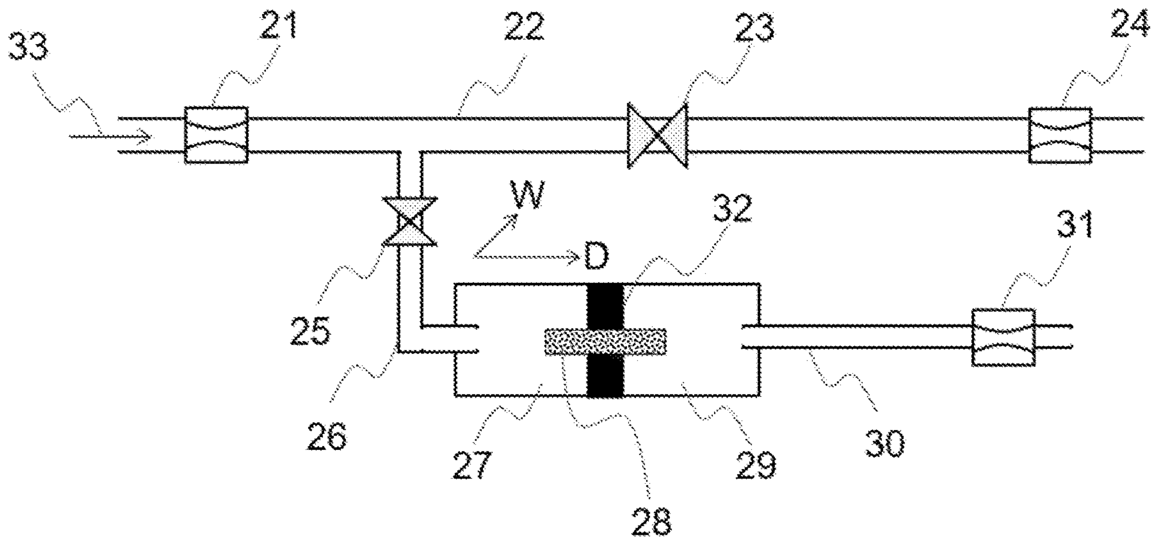

GAS DIFFUSION LAYER, MEMBRANE ELECTRODE ASSEMBLY, AND FUEL CELL

CROSS REFERENCE TO RELATED APPLICATIONS

This is the U.S. National Phase application of PCT/JP2019/025767, filed Jun. 28, 2019, which claims priority to Japanese Patent Application No. 2018-183744, filed Sep. 28, 2018, the disclosures of each of these applications being incorporated herein by reference in their entireties for all purposes.

FIELD OF THE INVENTION

The present invention relates to a gas diffusion layer containing a carbon sheet and a microporous layer that can be suitably used in a fuel cell, particularly in a polymer electrolyte fuel cell; a membrane electrode assembly containing the gas diffusion layer, and a fuel cell containing the gas diffusion layer.

BACKGROUND OF THE INVENTION

A polymer electrolyte fuel cell in which a hydrogen-containing fuel gas and oxygen-containing oxidizing gas are supplied to an anode and cathode, respectively, to generate an electromotive force through electrochemical reactions occurring at both poles is generally constructed mainly of a separator, a gas diffusion layer, a catalyst layer, an electrolyte membrane, a catalyst layer, a gas diffusion layer, and a separator stacked in this order. Such a gas diffusion layer is required to have a high gas diffusivity so that gas supplied from the separators are allowed to diffuse into the catalyst layer, a high water drainage rate so that the water resulting from the electrochemical reactions is discharged into the separators, and a high electrical conductivity so that the generated electrical current is taken out efficiently. To realize this, gas diffusion layers containing carbon sheet substrates formed of carbon fibers etc. and microporous layers laid on their surfaces have been used widely.

However, these gas diffusion layers have a problem of the trade-off relation between electrical conductivity and gas diffusivity. A major factor that influences the electrical conductivity is the formation of conductive paths resulting from the contact between conductive components such as carbon fiber present in the gas diffusion layer. A major factor that influences the gas diffusivity, on the other hand, is the internal porosity of the gas diffusion layer, that is, the volume of gas diffusion paths. If, with the aim of enhancing the electrical conductivity, a carbon sheet with a higher density is used to increase the conductive paths in order to produce a gas diffusion layer containing a carbon sheet with a reduced internal material resistance, the increased density of the carbon sheet causes a decrease in the gas permeation paths, leading to deterioration in the gas diffusivity. On the contrary, if, with the aim of improving the gas diffusivity, the density inside the carbon sheet is reduced to increase the gas permeation paths, the conductive paths inside the carbon sheet is increased, leading to deterioration in the electrical conductivity. Thus, it is difficult to achieve both high electrical conductivity and high gas diffusivity, and an effort to develop a gas diffusion layer intended to improve one of the features necessarily requires deterioration of the other feature. Accordingly, if an attempt is made to enhance the power generation performance of a fuel cell that contains a gas diffusion layer, there is necessarily a limit to the degree of performance improvement.

For example, methods that have been proposed so far include one designed for increasing the gas diffusivity and water drainage rate of the gas diffusion layer by adopting a water repellent roller for conveying the substrate in the step for coating a carbon sheet with a coating liquid that serves as a precursor of a microporous layer in order to suppress the penetration of the coating liquid in the through-plane direction perpendicular to the surface of the carbon sheet and increase the gas permeation paths inside the substrate (see Patent document 1) and one designed to improve the gas diffusivity in the thickness direction by adopting a gas diffusion layer that contains two types of carbon fibers with different sizes with the quantity of either of them changing in the thickness direction so that the pore diameter changes in the thickness direction (see Patent document 2). In addition, for the purpose of achieving both high gas diffusivity and high electrical conductivity, a proposal is made of a precursor sheet for a gas diffusion layer that contains short carbon fibers with an increased dispersibility and entangling tendency to serve for producing a gas diffusion layer characterized by large sheet strength, low manufacturing cost, high gas diffusivity, and high electrical conductivity (see Patent document 3).

PATENT DOCUMENTS

Patent document 1: Japanese Unexamined Patent Publication (Kokai) No. 2015-50073
Patent document 2: Japanese Unexamined Patent Publication (Kokai) No. 2018-14275
Patent document 3: Japanese Unexamined Patent Publication (Kokai) No. 2015-118944

SUMMARY OF THE INVENTION

However, in the case of the invention described in Patent document 1, the depressed penetration of the microporous layer precursor into the carbon sheet may result in the failure in forming a desirable microporous layer in the gas diffusion layer and accordingly, the conductive paths in the gas diffusion layer may increase, possibly leading to a decrease in electrical conductivity. On the other hand, the gas diffusion layers according to the inventions proposed in Patent documents 2 and 3 do not contain microporous layers and therefore, cannot achieve a high electrical conductivity as compared with gas diffusion layers containing microporous layers. In the case of a gas diffusion layer containing a microporous layer, the position and quantity of the microporous layer formed in the gas diffusion layer are of importance and accordingly, the components, areal weight, etc. of the microporous layer precursor coating liquid should be controlled appropriately according to the structure of the precursor sheet.

Thus, in view of the above conventional techniques as a background, an object of the present invention is to provide a gas diffusion layer that is high in both gas diffusivity and electrical conductivity and accordingly useful to produce a fuel cell that shows improved power generation performance as a result of containing this gas diffusion layer.

Another object of the present invention is to provide a method that serves for stable production of a gas diffusion layer having a sufficient degree of gas diffusivity and electrical conductivity that cannot be produced by any conventional method.

Still another object of the present invention is to provide a fuel cell including a gas diffusion layer as described above.

To solve the problems described above, as a result of intensive studies, the present inventors found that it is useful to adopt the means described below.

(1) A gas diffusion layer including a carbon sheet and a microporous layer disposed on at least one surface of the carbon sheet, and meeting the requirement "C is equal to or greater than 0", wherein:

C, which is referred to as "index for simultaneous realization of a required in-plane oxygen permeation coefficient and electrical resistance", is calculated by subtracting the product of B multiplied by 60 from A and adding 310 to the difference, A, which is referred to as "in-plane oxygen permeation coefficient", is the rate of oxygen permeation in an in-plane direction in the gas diffusion layer that occurs when a pressure of 0.5 MPa is applied in the through-plane direction to a surface of the gas diffusion layer to compress an arbitrarily selected region having a width of 10 mm and a depth of 3 mm in the gas diffusion layer, and B is the "electrical resistance" that occurs when the gas diffusion layer is compressed by applying a pressure of 2 MPa in the through-plane direction.

(2) A gas diffusion layer including a carbon sheet and a microporous layer disposed on at least one surface of the carbon sheet wherein:

the carbon sheet has a region containing carbon fiber and filled with a porous material with a pore size of 10 μm or more and 100 μm or less and a region filled with a porous material with a pore size of 0.01 μm or more and less than 10 μm (hereinafter referred to as internal porous body), and the internal porous body has an average thickness of 10 μm or more and 30 μm or less in the through-plane direction from the surface of the carbon sheet.

The present invention provides a gas diffusion layer that realizes simultaneously both a required oxygen permeability in an in-plane direction in the gas diffusion layer and electrical conductivity in the through-plane direction perpendicular to the gas diffusion layer, which has been difficult to achieve conventionally, and serves to produce a fuel cell with improved power generation performance.

BRIEF DESCRIPTION OF THE DRAWINGS

FIG. 1 is a schematic cross-sectional diagram for illustrating a typical structure of the gas diffusion layer according to embodiments of the present invention.

FIG. 2 is a schematic cross-section diagram for illustrating a typical membrane electrode assembly containing the gas diffusion layer according to embodiments of the present invention.

FIG. 3 is a schematic diagram that illustrates the method for measuring the in-plane oxygen permeation coefficient A of the gas diffusion layer according to embodiments of the present invention.

DETAILED DESCRIPTION OF EMBODIMENTS OF THE INVENTION

The carbon sheet and gas diffusion layer that are constituents of the present invention will be described in detail below.

First, the structure of the gas diffusion layer according to the present invention will be described with reference to drawings. FIG. 1 is a schematic cross-sectional diagram showing an example of the gas diffusion layer according to embodiments of the present invention.

In the example given in FIG. 1(*a*), the gas diffusion layer includes a carbon sheet 1 that has an internal porous body 4 disposed in the form of a layer on the inside of one surface 2 (surface X) in the carbon sheet 1 and has a microporous material 5 on the outside of the surface X. The expression "having an internal porous body 4 disposed in the form of a layer in the carbon sheet 1" means that the internal porous body 4 exists in the form of a layer in a gap portion in the carbon sheet 1, which is of a porous material. The internal porous body will be described later.

In the example given in FIG. 1(*b*), the gas diffusion layer includes a carbon sheet 1 that has an internal porous body 4 disposed in a nonuniformly distributed manner on the inside of one surface 2 (surface X) in the carbon sheet 1 and has a microporous material 5 on the outside of the surface X. The expression "having an internal porous body 4 disposed in a nonuniformly distributed manner in the carbon sheet 1" means that portions containing or not containing the internal porous body 4 coexist in a gap portion in the carbon sheet 1, which is of a porous material. In this case, the portions containing the internal porous body 4 may exist either discretely and discontinuously or reticulately and continuously. It is noted that FIG. 1(*b*) shows a more practical state.

FIG. 2 shows a typical membrane electrode assembly containing the gas diffusion layer according to embodiments of the present invention. The membrane electrode assembly according to embodiments of the present invention includes an electrolyte film 7 sandwiched between the catalyst layers 6*a* and 6*b*, and the gas diffusion layers 0*a* and 0*b* according to the present invention are disposed on both sides in such a manner that the microporous layers 5*a* and 5*b* are in contact with the catalyst layers 6*a* and 6*b*, respectively. It is noted that a separator, not shown in FIG. 2, is disposed on the surface 3 (surface Y), which is opposite to the surface 2 (surface X) of the carbon sheet 1.

The gas diffusion layer according to embodiments of the present invention shows high power generation performance when it meets the relation "C is equal to or greater than 0", i.e. the equation given below, wherein C, which is referred to as "index for simultaneous realization of a required in-plane oxygen permeation coefficient and electrical resistance", is calculated by subtracting the product of B multiplied by 60 from A and adding 310 to the difference, A, which is referred to as "in-plane oxygen permeation coefficient", being the rate of oxygen permeation in an in-plane direction in the gas diffusion layer that occurs when a pressure of 0.5 MPa is applied in the through-plane direction to a surface of the gas diffusion layer to compress an arbitrarily selected region having a width of 10 mm and a depth of 3 mm in the gas diffusion layer, and B being the "electrical resistance" that occurs when the gas diffusion layer is compressed by applying a pressure of 2 MPa in the through-plane direction.

$$C=(\text{in-plane oxygen permeation coefficient})-(\text{conductive resistance caused by compression in through-plane direction})\times 60+310\geq 0$$

Here, C is preferably 10 or more to realize a higher power generation performance, and C is more preferably 20 or more and 200 or less to realize an excellent power generation performance. It is noted that the through-plane direction means the direction perpendicular to the surface (i.e. the thickness direction).

The gas diffusion layer will be described in detail below.

[Carbon Sheet]

A carbon sheet to be used in the gas diffusion layer according to the present invention can be produced by carrying out steps for preparing a porous material containing carbon fiber or a precursor thereof as described later, impregnating it with a resin composition, heat-treating it, and carbonizing it. Here, in the case where no resin composition is incorporated, the step for impregnation can be omitted. A gas diffusion layer can be produced by laying a microporous layer on the carbon sheet. During such a processing process, the formation of an internal porous body and/or water repellent treatment may be performed as required.

For embodiments of the present invention, a porous material containing carbonized carbon fiber and a binder, along with an internal porous body precursor in the case where such a precursor is prepared before the carbonization or graphitization step, is processed into a carbon sheet.

It is important for the carbon sheet used in the gas diffusion layer according to embodiments of the present invention to be of a porous material. The use of a porous carbon sheet permits the simultaneous realization of both a high gas diffusivity and high water drainage rate. To form a porous carbon sheet, a good method is to use a porous material as production material for producing the carbon sheet.

For the present invention, the binder serves to bind carbon fibers. The binder contains a carbonized resin composition. When a water repellent agent is added in a carbon sheet used in the gas diffusion layer according to embodiments of the present invention, the water repellent agent is deemed to be a component of the binder.

Described next is the porous material used for preparing a carbon sheet. For a carbon sheet used in the gas diffusion layer according to embodiments of the present invention, it is important to have a high gas diffusivity for allowing the gas supplied from the separator to be diffused into the catalyst, a high water discharge rate for allowing the water generated from the electrochemical reactions to be discharged into the separator, and a high electrical conductivity for extracting the generated electrical current. To this end, it is preferable to use a porous material that has electrical conductivity and an average pore diameter of 10 to 100 μm. More specifically, the porous material to be used for preparing a carbon sheet is preferably a porous carbon fiber-containing material in the form of, for example, woven carbon fiber fabric, paper-like carbon fiber sheet, nonwoven carbon fiber fabric, etc. In particular, for preparing a carbon sheet, it is preferable to use a porous carbon fiber-containing material because it has high corrosion resistance, and it is more preferable that the so-called "carbon paper", which is produced by binding a paper-like carbon fiber sheet with a carbonized material, is used as the carbon sheet because it has the property of absorbing dimensional changes of an electrolyte membrane in the through-plane direction (thickness direction), i.e., the so-called "spring property". In addition, other woven carbon fiber fabrics include "carbon cloth" and other nonwoven carbon fiber fabrics include felt type "nonwoven carbon fabric". Described below is the paper-like carbon fiber sheet as a typical material.

For the present invention, a carbon sheet containing a paper-like carbon fiber sheet bound with a binder can be produced by impregnating a paper-like carbon fiber sheet with a resin composition, followed by carbonization, as described later.

Examples of carbon fibers present in the carbon sheet and the porous material used for producing it in the gas diffusion layer according to the present invention include polyacrylonitrile (PAN) based, pitch based, and rayon based carbon fibers. In particular, the use of a PAN based carbon fiber or a pitch based carbon fiber is preferred because of their high mechanical strength.

The carbon fiber present in the carbon sheet used in the gas diffusion layer according to the present invention preferably has an average single fiber diameter in the range of 3 to 20 μm, more preferably in the range of 5 to 10 μm. It may be good to adopt a preferred range that is defined by either of the aforementioned upper limits and either of the aforementioned lower limits. If the average single fiber diameter is 3 μm or more, the pore diameter will be large enough to realize an increased water drainage rate. On the other hand, if the average single fiber diameter is 20 μm or less, it serves to produce a fuel cell with a decreased water vapor diffusivity. When a fuel cell is operated at a relatively high temperature of 80° C. or more, the electrolyte film generally dries and the proton conductivity decreases, resulting in a decline in power generation performance. However, the aforementioned decrease in water vapor diffusivity acts to mitigate this disadvantage.

Here, the average single fiber diameter of carbon fiber is determined by photographing the carbon fiber under a microscope such as scanning electron microscope at a magnification of 1,000 times and 30 single fibers are selected at random and subjected to diameter measurement, followed by calculating the average. As the scanning electron microscope, S-4800 manufactured by Hitachi, Ltd. or an equivalent apparatus can be used.

A carbon fiber to be used for the present invention preferably has an average single fiber length in the range of 3 to 20 mm, more preferably in the range of 5 to 15 mm. If the average single fiber length is 3 mm or more, the carbon sheet is expected to be high in mechanical strength, electrical conductivity, and thermal conductivity. On the other hand, if the average single fiber length is 20 mm or less, the dispersibility of the carbon fiber in the papermaking step will be so high that a uniform carbon sheet can be obtained. Carbon fiber having such an average single fiber length can be obtained by, for example, cutting continuous carbon fibers to a desired length.

Here, the average single fiber length of carbon fiber is determined by photographing the carbon fiber under a microscope such as scanning electron microscope at a magnification of 50 times and 30 single fibers were selected at random and subjected to length measurement, followed by calculating the average. As the scanning electron microscope, S-4800 manufactured by Hitachi, Ltd. or an equivalent apparatus can be used.

The average diameter and average length of single fibers of carbon fiber in a carbon sheet are usually determined by directly observing single carbon fibers in the raw carbon fiber material, but they can be determined by observing the carbon sheet.

The paper-like sheet prepared by a papermaking technique, which represents a preferred form of porous material used for producing a carbon sheet, is preferably has a sheet-like structure in which carbon fibers are randomly dispersed in a two dimensional plane so that both the in-plane electrical conductivity and the thermal conductivity are maintained isotropically. The papermaking step for carbon fibers used to produce a paper-like carbon fiber sheet may be performed only once or performed multiple times to form a laminate.

A paper-like carbon fiber sheet to be used for the present invention preferably has an average carbon fiber areal weight in the range of 10 to 50 g/$m^2$, more preferably in the range of 15 to 35 g/$m^2$, and still more preferably in the range of 20 to 30 g/$m^2$. Here, it may be good to adopt a preferred range that is defined by either of the aforementioned upper limits and either of the aforementioned lower limits. If the carbon fiber in the paper-like carbon fiber sheet has an average areal weight of 10 g/$m^2$ or more, a carbon sheet with a high mechanical strength can be produced from the paper-like carbon fiber sheet. Furthermore, if the carbon fiber in the paper-like carbon fiber sheet has an average areal weight of 50 g/$m^2$ or less, a carbon sheet with a high in-plane gas diffusivity and water drainage rate can be produced from the paper-like carbon fiber sheet. If a plurality of paper-like sheets are stacked and bonded together to produce a paper-like carbon fiber sheet, it is preferable for the stacked paper-like carbon fiber sheet to have an areal weight in the above range.

<Impregnation with Resin Composition>

When preparing a carbon sheet to be used in the gas diffusion layer according to the present invention, it is preferable that the porous material containing carbon fiber, such as paper-like carbon fiber sheet, is impregnated with a resin composition that serves as a binder.

For the present invention, the binder present in the carbon sheet serves mainly to produce binding among carbon fibers, and a carbonized resin composition is used as the binder. A carbon fiber-containing porous material impregnated with a resin composition that serves as a precursory material for a carbon sheet is referred to herein as “prepreg”. A carbon sheet to be used in the gas diffusion layer according to the present invention can be produced from a prepreg. Good methods for impregnating a carbon fiber-containing porous material with a resin composition serving as a binder to produce a prepreg include a method in which a porous material is immersed in a solution containing a resin composition, a method in which a porous material is coated with a solution containing a resin composition, and a method in which a film of a resin composition is combined with a porous material so that it is transferred thereto. In particular, the method of immersing a porous material in a solution containing a resin composition is particularly preferred because of high productivity.

The resin composition to be used for preparing a prepreg is preferably a resin composition that can be carbonized in a subsequent baking step to form an electrically conductive carbonization product that serves as a binder. A resin composition that serves to produce a prepreg can be prepared by mixing resin components and adding a solvent etc. as required. Here, the resin components include resins such as thermosetting resins and may also include additives such as carbon powder and surfactant as required.

For embodiments of the present invention, examples of the resins that serve as the resin components of a resin composition used to prepare a prepreg include thermosetting resins such as phenolic resins, epoxy resins, melamine resins and furan resins. Of these, phenolic resins are used suitably because of high carbonization yield. Furthermore, some resin compositions can serve as binders in an uncarbonized form, and examples of useful thermoplastic resins include fluorine resin, ABS resin, polyethylene resin, acrylic resin, nylon resin, polypropylene resin, polyethylene terephthalate resin, and urethane resin.

In addition, for the purpose of providing a carbon sheet with improved mechanical properties, electrical conductivity, and thermal conductivity, carbon powder may be adopted as an additive that may be added as required as a resin component in the resin composition used for preparing a prepreg. Here, useful carbon powder materials include carbon black, carbon nanotube, carbon nanofiber, carbonized fine fibers of cellulose, chitin, and aramid, milled carbon fiber, graphite, and graphite flakes. Of these, carbon nanotube, carbon nanofiber, carbonized fine fibers of cellulose, chitin, and aramid, and milled carbon fiber are preferred when used to form high porosity pores in the surface layer.

The resin composition to be used for preparing a prepreg may contain resin components as listed above in unmodified forms and may also contain a variety of solvents, as required, for the purpose of ensuring efficient impregnation of a porous material such as paper-like carbon fiber sheet. Here, examples of such solvents include methanol, ethanol, and isopropyl alcohol.

The resin composition to be used for preparing a prepreg is preferably in a liquid state at a temperature of 25° C. under 0.1 MPa. If the resin composition is in a liquid state under the above measuring conditions, it works efficiently for impregnation of a paper-like sheet, and the resulting carbon sheet will have good mechanical properties, electrical conductivity, and thermal conductivity.

For the present invention, it is preferable for the impregnation to be performed in such a manner that the resin components account for 30 to 400 parts by mass, more preferably 50 to 300 parts by mass, relative to 100 parts by mass of the carbon fiber in the prepreg. Here, it may be good to adopt a preferred range that is defined by either of the aforementioned upper limits and either of the aforementioned lower limits. If the amount of the resin components consumed for impregnation accounts for 30 parts by mass or more relative to 100 parts by mass of the carbon fiber in the prepreg, the resulting carbon sheet will have good mechanical properties, electrical conductivity, and thermal conductivity. On the other hand, if the impregnation amount of the resin components accounts for 400 parts by mass or less, the resulting carbon sheet will have a high gas diffusivity in the in-plane direction and a high gas diffusivity in the through-plane direction.

<Heat Treatment>

For the present invention, a prepreg prepared by impregnating a porous material such as paper-like carbon fiber sheet with a resin composition may be heat-treated before it is subjected to a carbonization step.

For the present invention, this heat treatment is intended for thickening and curing the resin composition in the prepreg. Good heat treatment methods include a method of blowing hot air against the prepreg, a method of heating the prepreg by sandwiching it between hot platens of a press apparatus, and a method of heating the prepreg by sandwiching it between continuous belts.

<Carbonization>

For the present invention, a prepreg prepared by impregnating a porous material such as paper-like carbon fiber sheet with a resin composition is baked in an inert atmosphere to carbonize the resin composition. For this baking, a batch-type heating furnace or a continuous heating furnace can be used. Here, the inert atmosphere can be produced by supplying an inert gas such as nitrogen gas or argon gas into the furnace.

For the present invention, the maximum temperature in the baking step is preferably in the range of 1,300 to 3,000° C., more preferably in the range of 1,700 to 3,000° C., and still more preferably in the range of 1,900 to 3,000° C. Here, it may be good to adopt a preferred range that is defined by either of the aforementioned upper limits and either of the aforementioned lower limits. If the maximum temperature is 1,300° C. or more, carbonization of the resin component in the prepreg is facilitated to ensure the formation of a carbon sheet with high electrical conductivity and thermal conductivity. On the other hand, if the maximum temperature is 3,000° C. or less, the energy consumption for operating the heating furnace can be reduced.

For the present invention, the product produced by impregnating a porous material such as paper-like carbon fiber sheet with a resin composition and carbonizing them will be occasionally referred to as baked carbon fiber material. Thus, the term "carbon sheet" normally means a baked carbon fiber material, and the term "baked carbon fiber material" means a carbon sheet regardless of whether it has been subjected to water repellent treatment.

<Water Repellent Treatment>

For the present invention, the water repellent treatment of a carbon sheet is intended to increase the water discharge rate and can be realized by subjecting the baked carbon fiber material to water repellent treatment. In this case, the water repellent treatment can be carried out by coating the baked carbon fiber material with a water repellent agent and then heat-treating it. The methods for water repellent treatment of a carbon sheet also include those which do not perform direct water repellent treatment of a carbon sheet by coating the baked material with a water repellent agent and, for example, the carbon sheet may be coated with a microporous layer precursor coating liquid and then heat-treated to allow an water repellent agent present in the coating liquid to be transferred into the carbon sheet. In the case of direct coating of a carbon sheet with a water repellent agent, the water repellent treatment serves to produce a carbon sheet containing a water repellent agent as a binder. It is noted that if water repellent treatment is carried out using a water repellent agent, then the water repellent agent can be contained in the carbon sheet as a binder.

Here, as the water repellent agent, it is preferable to use a fluorine based polymer because it is high in corrosion resistance. Examples of the fluorine based polymer includes polytetrafluoroethylene (PTFE), tetrafluoroethylene-hexafluoropropylene copolymers (FEP), and tetrafluoroethylene-perfluoroalkylvinyl ether copolymers (PFA).

On the other hand, since fluorine based water repellent agents have insulating properties, thinly applying a water repellent agent to the surface of a baked carbon sheet serves to realize both high water repellency and high electrical conductivity to an electrically conductive separator. If the water repellent agent used for water repellent treatment has a preferred melting point of 150° C. or more and 400° C. or less, it serves to allow the melting of the resin and the drying of the carbon sheet having the resin adhered thereto can be performed efficiently, and it is more preferably 200° C. or more and 320° C. or less to ensure uniform wetting of the paper-like carbon fiber sheet by the resin spreading smoothly during the melting of the resin. Here, it may be good to adopt a preferred range that is defined by either of the aforementioned upper limits and either of the aforementioned lower limits.

Such useful water repellent agents include FEP and PFA type ones. The use of these materials serves for a remarkable increase in the water drainage rate of the carbon sheet having a structure used for the present invention to realize a large decrease in the accumulation of water in the water repellent carbon sheet, thus leading to a large increase in the gas diffusivity. As a result, the resulting fuel cell will have a considerably improved power generation performance.

The coating amount of the water repellent agent is preferably 1 to 50 parts by mass, more preferably 2 to 40 parts by mass, relative to 100 parts by mass of the baked carbon fiber material. Here, it may be good to adopt a preferred range that is defined by either of the aforementioned upper limits and either of the aforementioned lower limits. If the coating amount of the water repellent agent is 1 part by mass or more, the resulting carbon sheet will have a high water discharge rate. On the other hand, if the coating amount of the water repellent agent is 50 parts by mass or less, the resulting carbon sheet will have a high electrical conductivity.

For the water repellent treatment, a water repellent agent is applied on a baked carbon fiber material first, and then a microporous layer precursor coating liquid is applied, before performing the heat treatment of the baked carbon fiber material. As described later, it is preferable for the water repellent agent to be contained in the coating liquid as well, and in this case, as the coating liquid is applied on the carbon sheet, the water repellent agent present in the microporous layer precursor coating liquid moves into the carbon sheet. Accordingly, the amount of the water repellent agent existing in the carbon sheet after the heat treatment step is determined from the sum of the water repellent agent present in the carbon sheet before the application of the coating liquid and the water repellent agent contained in the coating liquid and transferred into the carbon sheet. At the surface Y (denoted by "3" in FIG. 1) of the carbon sheet that faces the separator, as the amount of the water repellent agent on the surface of carbon fibers in contact with the separator decreases, the contact resistance declines to make it possible to produce a gas diffusion layer having a high electrical conductivity. Furthermore, as the amount of the water repellent agent on carbon fibers in the interior of the carbon sheet decreases, the contact resistance among carbon fibers declines to make it possible to produce a gas diffusion layer having a high electrical conductivity. Here, as described above, the water repellent agent present in the coating liquid moves into the carbon sheet as the microporous layer precursor coating liquid is applied on the carbon sheet. In this step, the water repellent agent diffuses due to the concentration gradient and therefore, the concentration of the water repellent agent in the destination sheet is maintained uniform. Accordingly, a relatively small amount of the water repellent agent serves to develop an adequate degree of water repellency in the gas diffusion layer. Therefore, the amount of the water repellent agent on carbon fibers at the surface Y may be reduced for the purpose of improving the electrical conductivity of the gas diffusion layer, and the amount of the water repellent agent adhered to the carbon sheet in the gas diffusion layer can be used as an indicator for controlling the electrical conductivity of the carbon sheet. In the case where a fluorine based polymer is used as a water repellent agent, the ratio of the number of fluorine atoms to that of carbon atoms present on the carbon sheet can serve as an indicator of the amount of the water repellent agent adhered to the carbon sheet, and for the present invention, it is preferably in the range of 0.002 or more and 0.030 or less, more preferably 0.003 or more and 0.030 or less. The above fluorine ratio can be determined by X-ray microanalysis using secondary electrons. Specifically, the concentrations of fluorine and carbon atoms present on the surface of carbon fibers at the surface Y are measured at randomly selected 10 different points, and the measured ratios are averaged.

<Formation of Microporous Layer>

Described next is the microporous layer that serves as a constituent of the present invention. The carbon sheet used in the gas diffusion layer according to the present invention can work as a gas diffusion layer after forming a microporous layer on one surface thereof. The gas diffusion layer according to embodiments of the present invention has a microporous layer at least at the surface X of the carbon sheet.

For the present invention, it is preferable for the microporous layer to have an areal weight of 10 to 30 g/m$^2$. In the case where the microporous layer has an areal weight of 10 g/m$^2$ or more, when a microporous layer precursor coating liquid is applied on a carbon sheet, the coating liquid penetrates so easily into the carbon sheet in the through-plane direction perpendicular to the surface that a microporous layer is formed in the interior of the carbon sheet, and this microporous layer acts as the internal porous body. If the microporous layer has an areal weight of 30 g/m$^2$ or less, the coating liquid is prevented from penetrating excessively into the carbon sheet, and as a result, a microporous layer is formed in a region ranging in the through-plane direction from the surface X of the carbon sheet to an appropriate position in the interior of the carbon sheet. To control the region that contains the microporous layer, that is, the internal porous body, in the gas diffusion layer, it is more preferable that the microporous layer including the internal porous body has an areal weight in the range of 10 to 20 g/m$^2$. Here, it may be good to adopt a preferred range that is defined by either of the aforementioned upper limits and either of the aforementioned lower limits.

For the present invention, it is preferable for the microporous layer to contain electrically conductive particles. From the viewpoint of corrosion resistance, it is more preferable for the electrically conductive particles to contain carbon powder. Furthermore, from the viewpoint of improvement in the electrical conductivity and water drainage rate, the microporous layer may be formed of a porous material containing linear carbon and a water repellent agent. Examples of the carbon powder in the electrically conductive particles include carbon black materials such as furnace black, acetylene black, lamp black, and thermal black, graphite materials such as scaly graphite, scale-like graphite, earthy graphite, artificial graphite, expanded graphite, and flaky graphite, and other carbon powder materials such as CNT. Of these, carbon black is more preferred, and acetylene black is the most preferred because of a small impurity content.

For the present invention, it is preferable for the internal porous body to have a porosity of 80% or more and 95% or less. It is more preferably 85% or more and 95% or less. If the microporous layer has a porosity of 85% or more, gas diffusion in the in-plane direction is promoted to achieve an increased gas diffusivity and enhanced water drainage from the gas diffusion layer. On the other hand, if the microporous layer has a porosity of 95% or less, back-diffusion of gas is promoted, and therefore, in the case where a fuel cell is operated at a relatively high temperature of 80° C. or more, it serves to mitigate the disadvantage of the drying of the electrolyte film to cause a decrease in proton conductivity.

For the present invention, it is preferable for the microporous layer to contain a water repellent agent from the viewpoint of promoting the drainage of water in a liquid state. In particular, a fluorine based polymer is preferably used as the water repellent agent because it has high corrosion resistance. Examples of the fluorine based polymer includes polytetrafluoroethylene (PTFE), tetrafluoroethylene-hexafluoropropylene copolymers (FEP), and tetrafluoroethylene-perfluoroalkylvinyl ether copolymers (PFA).

A microporous layer can be formed by coating the surface of a carbon sheet with an electrically conductive particle-containing coating solution that contains electrically conductive particles as described above.

The electrically conductive particle-containing coating solution may also contain a dispersion medium such as water and organic solvent and may further contain a dispersion assistant such as surface active agent. The dispersion medium is preferably water, and it is preferable to use a nonionic surface active agent as the dispersion assistant. Furthermore, a variety of carbon powders and water repellent agents as described above may also be contained.

The coating of a carbon sheet with an electrically conductive particle-containing coating solution can be performed using an appropriate commercially available coating device. Useful coating techniques include screen printing, rotary screen printing, spraying, intaglio printing, gravure printing, die coating, bar coating, and blade coating. The coating techniques described above are only given as samples, and the invention is not limited thereto.

After coating the carbon sheet with an electrically conductive particle-containing coating solution, it is preferable to dry the coating solution at a temperature of 80° C. to 180° C. Specifically, the coated sheet is placed in a dryer set to a temperature of 80° C. to 180° C. and dried for a period in the range of 5 to 30 minutes. The drying air supply rate may be appropriately set, but rapid drying may induce micro-cracks in the surface. After drying the coated sheet, it is preferably put in a muffle furnace, a baking furnace, or a high temperature drying furnace and heated at a temperature of 300° C. to 380° C. for 5 to 20 minutes to melt the water repellent agent so that it can work as a binder to bind the electrically conductive particles such as carbon powder, thereby forming a microporous layer.

<Internal Porous Body>

For the present invention, it is preferable that, as shown in FIG. 1(*a*), an internal porous body 4 with a pore diameter of 0.01 μm or more and less than 10 μm is contained to form a near-surface layer-like region with an average thickness denoted by "12" immediately inside the surface 2 (surface X) of the carbon sheet 1. According to another preferred embodiment, as shown in FIG. 1(*b*), an internal porous body 4 with a pore diameter of 0.01 μm or more and less than 10 μm is nonuniformly distributed near the surface, i.e., immediately inside the surface 2 (surface X) of the carbon sheet 1. When such an embodiment is adopted, the average thickness of the near-surface area filled with the internal porous body immediately inside the surface 2 (surface X) of the carbon sheet 1 is defined as the thickness 12 of the internal porous body. In a carbon sheet, the region formed of carbon fiber contains pores mainly having pore diameters of 10 μm or more and 100 μm or less, whereas this internal porous body has pore diameters as described above. For this internal porous body, it is important to exist in a region ranging in the through-plane direction from the surface of the carbon sheet to an appropriate position. The average thickness 12 is preferably 10 μm or more and 30 μm or less, more preferably 12 to 25 μm, and still more preferably 15 to 25 μm, measured in the through-plane direction from the surface of the carbon sheet. Here, it may be good to adopt a preferred range that is defined by either of the aforementioned upper limits and either of the aforementioned lower limits. If the region measures 10 μm or more, the carbon sheet internal will have increased conductive paths to ensure a high electrical conductivity. On the other hand, if it measures 30 μm or less, gas permeation paths will be formed favorably in the carbon sheet to ensure a high gas diffusivity. Here, the position and thickness of the internal porous body can be determined by photographing a through-plane cross section of a carbon sheet or gas diffusion layer at a high magnification and examining the photograph.

Because of small pore diameters, the internal porous body serves to increase the electrical conductivity among carbon fibers and decrease the electrical resistance of the gas diffusion layer. In the carbon sheet production process, the internal porous body can be formed by applying an internal porous body precursor coating liquid on the intended surface X of the carbon sheet before the baking step. In this case, the internal porous body is formed before applying a microporous layer precursor coating liquid on the carbon sheet, and therefore, this serves to prevent the microporous layer precursor coating liquid from penetrating excessively into the carbon sheet. This enables the production of a carbon sheet with a high gas permeability. For the present invention, in the case where the internal porous body precursor is formed before the carbon sheet carbonization step, the baked carbon fiber material including the internal porous body is regarded as a carbon sheet. Instead, the internal porous body may be formed by applying an internal porous body precursor coating liquid after producing the carbon sheet, and in this case, the microporous layer precursor coating liquid may also be used as the internal porous body precursor coating liquid. It is preferable for the internal porous body in the carbon sheet to have an areal weight in the range of 3 g/m$^2$ or more and 15 g/m$^2$ or less, more preferably 5 g/m$^2$ or more and 12 g/m$^2$ or less. Here, it may be good to adopt a preferred range that is defined by either of the aforementioned upper limits and either of the aforementioned lower limits.

In the case where the internal porous body is formed in the carbon sheet production step, the internal porous body precursor coating liquid to be used may be a resin composition containing a material to form electrically conductive particles after the baking step and a mixture of resins to work as binders after the baking step. Examples of such a material to form electrically conductive particles after the baking step include carbon black, carbon nanotube, carbon nanofiber, carbonized fine fibers of cellulose, chitin, and aramid, milled carbon fiber, graphite, and graphite flakes. Of these, carbon nanotube, carbon nanofiber, carbonized fine fibers of cellulose, chitin, and aramid, and milled carbon fiber are preferred when forming a high-porosity internal porous body.

[Features of Carbon Sheet]

Described below are major features of carbon sheets designed for use in the gas diffusion layer according to embodiments of the present invention that are produced by carrying out the steps described above.

For the present invention, if the layer-like region ranging in the through-plane direction from the surface (surface X) of the microporous layer in the carbon sheet to a position of 20 μm is defined as the surface layer, it is preferable for the surface layer of the carbon sheet to have a density of 0.34 g/cm$^3$ or more, and it is preferably 0.80 g/cm$^3$ or less as the upper limit. In addition, the overall density of the carbon sheet entire is preferably in the range of 0.29/cm$^3$ or more and 0.33 g/cm$^3$ or less. Specifically, for the carbon sheet to be used according to this embodiment of the present invention, it is important that the density of the surface layer in the carbon sheet is higher than the overall density of the carbon sheet. If the density of the surface layer is 0.34 g/cm$^3$ or more, the pore diameter in the carbon sheet tends to decrease, allowing the thickness in the through-plane direction of the internal porous body present in the carbon sheet to be controlled in the range described later. Accordingly, the microporous layer can cover the surface of the carbon sheet, and this serves to prevent carbon fibers from protruding out of the microporous layer, leading to a higher surface quality. In addition, electrical conductivity will increase, and high power generation performance will be realized both at high temperatures and at low temperatures. If the overall density of the carbon sheet is 0.29 g/cm$^3$ or more, electrically conductive paths will be formed in the carbon sheet, and a gas diffusion layer containing this carbon sheet will have a high electrical conductivity. On the other hand, if the overall density of the carbon sheet is 0.33 g/cm$^3$ or less, moderate pores are formed in the carbon sheet, and a gas diffusion layer containing this carbon sheet will have a high gas diffusivity.

A carbon sheet having a density as described above can be produced by controlling the areal weight of the carbon fiber in the prepreg, the amount of the resin component relative to the amount of the carbon fiber, and the thickness of the carbon sheet as described later in relative to the production method for carbon sheets. Here, the density of the carbon sheet can be determined by dividing the areal weight of the carbon sheet, measured using an electronic balance, by the thickness of the carbon sheet pressed under a pressure of 0.15 MPa.

It is preferable for a carbon sheet used in the gas diffusion layer according to the present invention to have a thickness of 50 to 230 μm, more preferably 70 to 180 μm, and still more preferably 90 to 130 μm. Here, it may be good to adopt a preferred range that is defined by either of the aforementioned upper limits and either of the aforementioned lower limits. The thickness of the carbon sheet is preferably 230 m or less, more preferably 180 m or less, and still more preferably 130 m or less, which will act to increase the gas diffusivity and facilitate easy drainage of the generated water. It also serves for the production of a fuel cell having a decreased overall size. On the other hand, if the carbon sheet has a thickness of 50 μm or more, more preferably 70 μm or more, and still more preferably 90 μm or more, efficient gas diffusion is facilitated in the in-plane direction in the carbon sheet to permit easy improvement of the fuel cell performance.

Here, the thickness of a carbon sheet used in the gas diffusion layer according to the present invention is measured by the method described below. Specifically, a carbon sheet and a gas diffusion layer are placed on a smooth-surfaced platen, and the thickness is measured with a pressure of 0.15 MPa being applied thereto. Specimens are taken from 10 different portions, and the measurements are averaged to represent the thickness.

To measure the density of the surface layer of a carbon sheet, a cross section of the gas diffusion layer is prepared by ion cutting and observed by SEM to identify the position of the surface X of the carbon sheet. Next, assuming that the surface layer ranges from the surface X to a position of 20 μm in the cross section in the SEM image, the total area of the regions filled with substances in the surface layer is determined and divided by the area of the surface layer to calculate the substance filling rate. The product of the filling rate multiplied by the density of the substances is defined as the surface layer density. Here, the carbon sheet can be separated from the diffusion layer. For example, the carbon sheet can be isolated by heating the gas diffusion layer in the atmosphere at 600° C. for 30 minutes so that the resin composition contained in the microporous layer in the gas diffusion layer is decomposed oxidatively, followed by ultrasonic treatment in ethanol.

<Membrane Electrode Assembly>

For the present invention, a membrane electrode assembly can be formed by joining the gas diffusion layer to a solid polymer electrolyte membrane with a catalyst layer interposed in between. At this time, if the gas diffusion electrode substrate is disposed in such a manner that the microporous layer faces the catalyst layer, back-diffusion of the generated water will occur more easily and in addition, the area of contact between the catalyst layer and the gas diffusion layer will increase, leading to a decrease in contact resistance.

<Fuel Cell>

The fuel cell according to the present invention contains the gas diffusion layer according to embodiments of the present invention, and the aforementioned membrane electrode assembly is sandwiched between separators. That is, a fuel cell can be produced by disposing separators on both sides of the aforementioned membrane electrode assembly. Usually, a plurality such membrane electrode assemblies, each having a separator on each surface with a gasket interposed in between, are stacked to construct a polymer electrolyte fuel cell. The catalyst layer includes a layer containing a solid polymer electrolyte and a catalyst-carrying carbon material. As the catalyst, platinum is usually used. In a fuel cell in which a carbon monoxide-containing reformed gas is supplied to the anode, it is preferable to use platinum and ruthenium as catalysts for the anode. As the solid polymer electrolyte, it is preferable to use a perfluorosulfonic acid-based polymer material that is high in proton conductivity, oxidation resistance, and heat resistance. For fuel cell units and fuel cells, these structures themselves are well known.

EXAMPLES

Next, the gas diffusion layer according to the present invention will be described in detail with reference to Examples, although the present invention is not limited to these Examples.

Described below are the materials, the production methods for carbon sheets and gas diffusion layers, and the evaluation methods for the gas diffusion layers and fuel cells that were used in the Examples.

<Preparation of Carbon Sheet>

Polyacrylonitrile based carbon fiber (Torayca (registered trademark) T300, manufactured by Toray Industries, Inc., average carbon fiber diameter 7 μm) was cut to an average length of 12 mm, dispersed in water, and processed by a wet papermaking technique for continuous production of a paper-like material. Subsequently, a 10 mass % aqueous solution of polyvinyl alcohol, used as binder, was spread over the paper-like material and dried to prepare a paper-like sheet having a carbon fiber areal weight of 25 $g/m^2$. The amount of the adhered polyvinyl alcohol was 22 parts by mass relative to 100 parts by mass of the paper-like carbon fiber sheet.

Next, a resin composition prepared by mixing a resol type phenolic resin and a novolak type phenolic resin, used as thermosetting resin components, at a mass ratio of 1:1, scaly graphite (average particle diameter 5 μm) as carbon powder, and methanol as solvent were blended at a thermosetting resin/carbon powder/solvent ratio of 10 parts by mass/5 parts by mass/85 parts by mass, and the resulting mixture was stirred for 1 minute using an ultrasonic dispersion apparatus to obtain a uniformly dispersed resin composition.

Next, the paper-like carbon fiber sheet was cut to a size of 15 cm×12.5 cm and immersed horizontally in a resin composition in an aluminum tray and then sandwiched and squeezed between rolls to perform impregnation. Here, two rolls were arranged horizontally with an appropriate clearance provided in between, and the paper-like carbon fiber sheet was lifted upward in the vertical direction, thus adjusting the overall deposition amount of the resin composition. If a smooth metal roll deprived of the excess resin using a doctor blade is used for one surface whereas a gravure roll having irregularities is used for the other surface, the difference in the resin deposition between the two surfaces can be adjusted by squeezing the resin composition between them. After the impregnation, drying was performed by heating at a temperature of 100° C. for 5 minutes to prepare a prepreg. Next, the prepreg was heat-treated at a temperature of 180° C. for 5 minutes while pressing it under a flat plate press machine. When pressing the prepreg, the space between the upper and lower pressing plates was adjusted by disposing a spacer outside the thickness-directional end surface of the prepreg in the flat plate pressing machine.

A substrate prepared by heat-treating the prepreg was introduced into a heating furnace in which a nitrogen gas atmosphere with a maximum temperature of 2,400° C. was maintained to produce a carbon sheet (thickness 135 μm) formed of a baked carbon fiber.

<Water Repellent Treatment>

The carbon sheet prepared above was immersed in an aqueous dispersion liquid of PTFE resin (Polyflon (registered trademark) PTFE Dispersion D-1E, manufactured by Daikin Industries, Ltd) or an aqueous dispersion liquid of FEP resin (Neoflon (registered trademark) FEP Dispersion ND-110, manufactured by Daikin Industries, Ltd), which were used as water repellent agent, thereby impregnating the baked carbon fiber with a water repellent agent. Subsequently, it was dried by heating in a drying furnace at a temperature of 100° C. for 5 minutes to provide a water repellent carbon sheet. An aqueous dispersion liquid of a water repellent agent was diluted before use to an appropriate concentration so that the water repellent agent would account for 0 to 5 parts by mass relative to 100 to 95 parts by mass of the carbon sheet after drying. Instead, in the case where the carbon sheet was not subjected directly to the above water repellent treatment, a microporous layer precursor coating liquid or an internal porous body precursor coating liquid containing a fluorine based polymer was used in the step for applying a microporous layer precursor coating liquid on the carbon sheet or in the step for applying an internal porous body precursor coating liquid on the carbon sheet, thereby allowing the fluorine based polymer to be transferred into the carbon sheet to make the carbon sheet water-repellent.

<Preparation of Gas Diffusion Layer>

<Materials>

Carbon powder A: acetylene black: Denka Black (registered trademark), manufactured by Denka Company Limited Carbon powder B: linear carbon: VGCF (registered trademark), manufactured by Showa Denko K.K., aspect ratio: 70

Material C: water repellent agent: FEP resin (Neoflon (registered trademark) FEP Dispersion ND-110, manufactured by Daikin Industries, Ltd., an aqueous dispersion liquid containing 25 parts by mass of FEP resin)

Material D: novolac-type phenol resin: Tamanol (registered trademark) 759, manufactured by Arakawa Chemical Industries, Ltd.

Material E: surface active agent: Triton (registered trademark) X-100, manufactured by Nacalai Tesque Solvent F: methanol Dispersion medium G: purified water The materials listed above were mixed in the proportions specified in Table 1 using a dispersing machine to prepare the microporous layer precursor coating liquid 1 and the internal porous body precursor coating liquids 2 to 4. Then, an internal porous body precursor coating liquid was spread over a carbon sheet using a slit die coater, and carbonization treatment was performed as required. The microporous layer precursor coating liquid was spread over this carbon sheet to form a planer microporous layer. The coating solutions used here were prepared by mixing a carbon powder, water repellent agent, surface active agent, and purified water so as to provide electrically conductive particle-containing coating liquids containing them as specified in parts by mass in Table 1. It is noted that the blending amount of the FEP resin shown in Table 1 is the amount of the FEP resin alone, rather than the amount of the aqueous dispersion liquid of the FEP resin. The microporous layer precursor coating liquid was spread over a carbon sheet using a die coater, followed by heating at a temperature of 120° C. for 10 minutes and additional heating at a temperature of 380° C. for 10 minutes to form a microporous layer.

<Measurement of Areal Weight of Microporous Layer>

The areal weight [g/m$^2$] of a carbon sheet or a gas diffusion layer was determined by cutting out a 10 cm×10 cm sample and dividing the mass by the area (0.01 m$^2$) of the sample. In addition, the difference calculating by subtracting the areal weight of the carbon sheet from the areal weight of the gas diffusion layer was adopted as the areal weight of the microporous layer.

<Measurement of Thickness and Density>

A carbon sheet and a gas diffusion layer were placed on a smooth-surfaced platen, and the thickness was measured with a pressure of 0.15 MPa being applied thereto. Specimens were taken from 10 different portions, and the measurements were averaged to represent the thickness. In addition, the areal weight was divided by the thickness to calculate the density [g/cm$^3$].

<Evaluation of In-Plane Oxygen Permeation Coefficient A of Gas Diffusion Layer>

A steam gas/water vapor permeation and diffusion evaluation apparatus (MVDP-200C, manufactured by Seika Corporation) was used. In a piping system as illustrated in FIG. 3, only the valve A (23) was opened, with the valve B (25) closed, to supply the nitrogen gas 33 through the primary pipe A (22). A predetermined rate (190 cc/min) of gas was allowed to flow through the mass flow controller (21) so that the gas pressure applied to the pressure controller (24) was adjusted to 5 kPa above the atmospheric pressure. A gas diffusion layer (28) was set on the sealer (32), which had a width of 10 mm and a depth of 3 mm and installed between the gas room A (27) and the gas room B (29), and the sealer is compressed so that a pressure of 0.5 MPa was applied to a region with a width of 10 mm and a depth of 3 mm of the gas diffusion layer. Then, the valve A (23) was closed and the valve B (25) was opened to allow nitrogen gas to flow through the pipe B (26). The nitrogen gas flow entering the gas room A (27) moved through pores in the gas diffusion layer (28) into the gas room B (29), passed through the pipe C (30) and the gas flow rate meter (31), and exited into the atmosphere. In this instance, the rate of gas flow (cc/min) through the gas flow meter (31) was measured, and 90.9% of the measured value was adopted as the in-plane oxygen permeation coefficient A [cc/min] of the compressed region having a width of 10 mm and a depth of 3 mm.

<Evaluation of Electrical Resistance B>

To determine the electrical resistance of a gas diffusion layer, a 2.0 cm×2.0 cm specimen is cut out of the gas diffusion layer and sandwiched between two gold-plated plates, and an electrical current of 1.0 A was applied in the thickness direction of the gas diffusion layer specimen under a uniform pressure of 2.0 MPa, followed by multiplying the measured electrical resistance by the electrode area of 4 cm$^2$.

<Evaluation of Simultaneous Realization of Required Gas Diffusivity and Electrical Conductivity>

To evaluate the simultaneous realization of a required gas diffusivity and electrical conductivity, the value C was calculated by subtracting the product of B multiplied by 60 from A and adding 310 to the difference, wherein A is the in-plane oxygen permeation coefficient calculated as described above and B is the electrical resistance under pressure calculated as described above.

<Measurement of Element Ratio Between Fluorine and Carbon>

On the carbon fibers on the surface of the gas diffusion layer opposite to the surface carrying a microporous layer, 10 different points were selected at random, observed at a magnification of 2,000 under a scanning electron microscope operated at an accelerating voltage of 7 kV, and subjected to point analysis of the number of fluorine atoms and the number of carbon atoms, followed by averaging the 10 measurements of the ratio of the number of fluorine atoms to the number of carbon atoms to represent the fluorine/carbon element ratio on the carbon fibers. Here, the scanning electron microscope used was S-3500N manufactured by Hitachi, Ltd. and the energy dispersion type X-ray analysis apparatus used was EX-370 manufactured by Horiba, Ltd.

In addition, by a procedure similar to that described above, 10 different points were selected at random on the carbon fibers in the through-thickness central portion of the carbon sheet in the gas diffusion layer and the fluorine/carbon element ratio was determined.

<Measurement of Porosity and Average Thickness of Internal Porous Body>

The porosity of an internal porous body was measured as described below. First, a through-plane cross section of the gas diffusion layer was observed under a scanning electron microscope (S-3500, manufactured by Hitachi, Ltd.), and 20 different positions were selected at random on the internal porous body present in the carbon sheet, followed by taking enlarged photographs at a magnification of about 2,000. Then, the pore portions and the non-pore portions of each of the 20 photographs taken above were cut out separately, and the ratio of the area of the pore portions to the total area of the pore portions and the non-pore portions was calculated to represent the porosity in each photograph. Finally, the porosity values obtained above were averaged over the 20 photographs to calculate the average porosity. The preparation of the through-plane cross section was performed using an ion milling apparatus (IM4000, manufactured by Hitachi, Ltd.). Even when the microporous layer has a nonuniform structure, the above method is designed to average the measurements taken at 20 positions selected at random, thereby making it possible to determine the average porosity [%] of the internal porous body. In this instance, furthermore, measuring the area of the region occupied by the internal porous body enables the determination of the thickness of the internal porous body assuming that it exists uniformly in the carbon sheet, and this was adopted as the average thickness of the internal porous body (denoted by 12 in FIG. 1).

<Calculation Method for Areal Weight of Internal Porous Body>

The areal weight of the internal porous body was calculated as the product of the density multiplied by the average thickness of the internal porous body. Here, the density of the internal porous body can be calculated by the following equation from the porosity of the internal porous body and the true density 2.1 g/cm$^3$ of the substance constituting the internal porous body used in Examples and Comparative examples. For the average thickness, the value determined in the section <Measurement of porosity and average thickness of internal porous body> was used.

Density of internal porous body [g/cm$^3$]=2.1 [g/cm$^3$]×(1−porosity of internal porous body [%]/100)

<Calculation Method for Density of Surface Layer>

First, 20 through-plane cross sections of the gas diffusion layer were selected at random and each cross section was observed by SEM at a magnification of about 200. Then, in each observed portion, the region ranging from the surface of the carbon sheet perpendicularly to a position of 20 μm was examined to determine the total area of the spaces filled with carbon fibers or the substance constituting the internal porous body. Here, the substance filling rate in the region containing the internal porous body can be calculated by multiplying the area of the region containing the internal porous body by the porosity. Then, the substance filling rate in the surface layer region was multiplied by the density of the filling substance, i.e. 2.1 g/cm$^3$. This calculation was performed for the 20 portions and the resulting products were averaged to represent the density of the surface layer.

<Evaluation of Power Generation Performance of Polymer Electrolyte Fuel Cell>

To prepare a catalyst solution, 1.00 g of carbon-supported platinum (manufactured by Tanaka Kikinzoku Kogyo K. K., platinum accounting for 50% by mass), 1.00 g of purified water, 8.00 g of a Nafion (registered trademark) solution (Nafion (registered trademark), manufactured by Aldrich, accounting for 5.0% by mass), and 18.00 g of isopropyl alcohol (manufactured by Nacalai Tesque) were added in this order.

Then, a Naflon (registered trademark) PTFE tape (TOMBO (registered trademark) No. 9001, manufactured by NICHIAS Corporation) cut to a size of 5 cm×5 cm was spray-coated with the catalyst solution and dried at normal temperature to prepare a PTFE sheet carrying a catalyst layer with 0.3 mg/cm$^2$ of platinum. Then, an 8 cm×8 cm solid polymer electrolyte film (Nafion (registered trademark) NRE-211CS, manufactured by DuPont) was sandwiched between two catalyst layer-coated PTFE sheets and pressed at a temperature of 130° C. for 5 minutes under a pressure of 5 MPa in a flat-plate pressing machine to transfer the catalyst layers to the solid polymer electrolyte film. After the pressing step, the PTFE sheets were removed to provide a catalyst layer-coated solid polymer electrolyte film.

Next, the gas diffusion layer prepared in each Example and Comparative example was cut to provide two 5 cm×5 cm sheets, and they were used to sandwich the catalyst layer-coated solid polymer electrolyte film, followed by pressing them at a temperature of 130° C. for 5 minutes under a pressure of 3 MPa in a flat-plate pressing machine to provide a membrane electrode assembly. The gas diffusion layer was disposed in such a manner that the microporous layer surface came in contact with the catalyst layer.

The resulting membrane electrode assembly was incorporated into a fuel cell evaluation unit cell, followed by measuring the changes in output voltage at a current density of 2.0 A/cm$^2$. Here, the separator used was a single flow channel serpentine type separator having a 1.0 mm channel width, 1.0 mm channel depth, and 1.0 mm rib width. For the evaluation, furthermore, an unpressurized hydrogen flow and an unpressurized air flow were supplied to the anode side and the cathode side, respectively.

Example 1

A carbon sheet was prepared and subjected to water repellent treatment through impregnation with a water repellent agent according to the procedure described above in <Preparation of carbon sheet> and an internal porous body was formed using a microporous layer precursor coating liquid to produce a gas diffusion layer according to the procedure described in <Preparation of gas diffusion layer>. It was found to be good in terms of the simultaneous realization of a required gas diffusivity and electrical conductivity and high in power generation performance. Results are shown in Table 2.

Example 2

Except that the microporous layer had an areal weight of 20 g/m$^2$ and that the internal porous body had a thickness of 11 μm, the same procedure as in Example 1 was carried out to produce a gas diffusion layer. The internal porous body had a further optimized average thickness to achieve increased gas permeation paths, resulting in a higher gas diffusivity than in Example 1. It was found to be good in terms of the simultaneous realization of a required gas diffusivity and electrical conductivity and high in power generation performance. Results are shown in Table 2.

Example 3

Except that the microporous layer had an areal weight of 5 g/m$^2$, that the coating clearance of the microporous layer precursor coating liquid was decreased, and that the internal porous body had a thickness of 20 μm, the same procedure as in Example 1 was carried out to produce a gas diffusion layer. The internal porous body had a further optimized areal weight, resulting in a higher gas diffusivity than in Example 1. It was found to be good in terms of the simultaneous realization of a required gas diffusivity and electrical conductivity and high in power generation performance. Results are shown in Table 2.

Example 4

Except that the microporous layer had an areal weight of 10 g/m$^2$ and that the internal porous body had an average thickness of 10 μm, the same procedure as in Example 1 was carried out to produce a gas diffusion layer. It was found to be better in terms of the simultaneous realization of a required gas diffusivity and electrical conductivity and higher in power generation performance. Results are shown in Table 2.

Example 5

Except that the water repellent treatment of the carbon sheet was performed with a smaller amount of the water repellent agent, the same procedure as in Example 4 was carried out to produce a gas diffusion layer having a fluorine/carbon ratio of 0.020 on the fibers of the surface Y. Accordingly, the use of a further optimized amount of the water repellent agent served to increase the electrical conductivity and the resulting gas diffusion layer was still better in terms of the simultaneous realization of a required gas diffusivity and electrical conductivity and still higher in power generation performance. Results are shown in Table 2.

Example 6

Except that the water repellent treatment of the carbon sheet was performed with a still smaller amount of the water repellent agent, the same procedure as in Example 5 was carried out to produce a gas diffusion layer having a fluorine/carbon ratio of 0.015 on the fibers of the back surface. Accordingly, the use of a further optimized amount of the water repellent agent served to further increase the electrical conductivity and the resulting gas diffusion layer was still better in terms of the simultaneous realization of a required gas diffusivity and electrical conductivity and extremely high in power generation performance. Results are shown in Table 2.

Example 7

Except that, instead of immersing the carbon sheet in a water repellent agent, a microporous layer precursor coating liquid was used for water repellent treatment of the carbon sheet, the same procedure as in Example 6 was carried out to produce a gas diffusion layer having a fluorine/carbon ratio of 0.0050 on the fibers of the back surface. It was found to be excellent in terms of the simultaneous realization of a required gas diffusivity and electrical conductivity and extremely high in power generation performance. Results are shown in Table 2.

Example 8

Except that in performing the method described in <Preparation of gas diffusion layer>, a carbon sheet was coated with the internal porous body precursor coating liquid 2 and, after drying, coated with the microporous layer precursor coating liquid 1, the same procedure as in Example 7 was carried out to produce a gas diffusion layer having an internal porous body with a porosity of 80%. It was found that the increase in porosity served to increase the gas diffusivity. The gas diffusion layer was excellent in terms of the simultaneous realization of a required gas diffusivity and electrical conductivity and extremely high in power generation performance. Results are shown in Table 2.

Example 9

Except that in performing the method described in <Preparation of gas diffusion layer>, a carbon sheet was coated with the internal porous body precursor coating liquid 3 and, after drying, coated with the microporous layer precursor coating liquid 1, the same procedure as in Example 7 was carried out to produce a gas diffusion layer having an internal porous body with a porosity of 90%. In spite of an increase in the porosity, the internal porous body had an increased average thickness, and accordingly, the gas diffusion layer had a higher electrical conductivity than in Example 8, although failing to have an increased gas diffusivity. It was excellent in terms of the simultaneous realization of a required gas diffusivity and electrical conductivity and extremely high in power generation performance. Results are shown in Table 2.

Example 10

Except that in performing the method described in <Preparation of gas diffusion layer>, a carbon sheet was coated with the internal porous body precursor coating liquid 4 and, after drying and carbonization, coated with the microporous layer precursor coating liquid 1, the same procedure as in Example 7 was carried out to produce a gas diffusion layer having an internal porous body with a porosity of 91%. The surface layer density slightly decreased and the gas diffusivity was higher than in Example 9. The gas diffusion layer was excellent in terms of the simultaneous realization of a required gas diffusivity and electrical conductivity and extremely high in power generation performance. Results are shown in Table 2.

Example 11

The carbon sheet preparation method was altered. First, long fibers of polyacrylonitrile were subjected to flameproofing treatment at a temperature of 200° C. for 10 minutes, and a nonwoven fabric was prepared by hydroentangling and roll-pressed. It was introduced into a heating furnace at a temperature of 2,000° C. to provide a carbon sheet formed of baked carbon fiber nonwoven fabric with a thickness of 150 μm. Then, a gas diffusion layer was produced using this carbon sheet by the procedure described in Example 1. It was good in terms of the simultaneous realization of a required gas diffusivity and electrical conductivity and high in power generation performance. Results are shown in Table 2.

Example 12

Except that the same nonwoven fabric as used in Example 11 was adopted as the carbon sheet and that the internal porous body had an areal weight of 5 $g/m^2$, the same procedure as in Example 9 was carried out to produce a gas diffusion layer. It was excellent in terms of the simultaneous realization of a required gas diffusivity and electrical conductivity and extremely high in power generation performance. Results are shown in Table 2.

Example 13

Except that the internal porous body had an areal weight of 5 $g/m^2$ and that the microporous layer had an areal weight of 5 $g/m^2$, the same procedure as in Example 1 was carried out to produce a gas diffusion layer. It had a high gas diffusivity, but the smaller areal weight of the microporous layer resulted in a slight decrease in the electrical conductivity. It was good in terms of the simultaneous realization of a required gas diffusivity and electrical conductivity and high in power generation performance. Results are shown in Table 2.

Example 14

Except that the microporous layer had an increased areal weight of 25 $g/m^2$ and that the coating clearance in the microporous layer precursor coating step was increased, the same procedure as in Example 2 was carried out to produce a gas diffusion layer having an internal porous body with an average thickness of 30 μm. It was good in terms of the simultaneous realization of a required gas diffusivity and electrical conductivity and high in power generation performance. Results are shown in Table 2.

Example 15

Except that the coating clearance of the microporous layer precursor coating liquid was decreased as compared with Example 14, the same procedure as in Example 14 was carried out to produce a gas diffusion layer having an internal porous body with an average thickness of 26 μm. It was good in terms of the simultaneous realization of a required gas diffusivity and electrical conductivity and high in power generation performance. Results are shown in Table 2.

Comparative Example 1

Except that the coating clearance of the microporous layer precursor coating liquid was decreased as compared with Example 1 and that the internal porous body had an average thickness of 33 μm, the same procedure as in Example 1 was carried out to produce a gas diffusion layer. It was poor in terms of the simultaneous realization of a required gas diffusivity and electrical conductivity and low in power generation performance. Results are shown in Table 2.

Comparative Example 2

Except that the areal weight of carbon fiber used for the carbon sheet preparation was 29 g/m$^2$ to prepare a carbon sheet with a higher density as compared with Example 1, the same procedure as in Example 1 was carried out to produce a gas diffusion layer. It was poor in terms of the simultaneous realization of a required gas diffusivity and electrical conductivity and low in power generation performance. Results are shown in Table 2.

Comparative Example 3

As compared with Example 1, a microporous layer precursor coating liquid is applied to release paper to an areal weight of 13 g/m$^2$ and dried at a temperature of 100° C. to produce a dried microporous layer precursor. It was put on a carbon sheet in such a manner that the dried microporous layer precursor faced with the carbon sheet and a pressure was applied. Then, the release paper was peeled at a temperature of 120° C. to allow the dried microporous layer precursor to be transferred on the carbon sheet, followed by heating in the air at a temperature of 380° C. for 10 minutes to produce a gas diffusion layer. The internal porous body formed in this way had an average thickness of as small as 3 μm. Then, a gas diffusion layer was produced in otherwise the same way as in Example 1. It was poor in terms of the simultaneous realization of a required gas diffusivity and electrical conductivity and low in power generation performance. Results are shown in Table 2.

TABLE 1 in parts

| Coating liquid material | Microporous layer precursor coating liquid 1 | Internal porous body precursor coating liquid 2 | Internal porous body precursor coating liquid 3 | Internal porous body precursor coating liquid 4 |
|---|---|---|---|---|
| Carbon powder A: Denka Black (registered trademark) | 7.7 | 3.4 | — | |
| Carbon powder B: VGCF (registered trademark) | — | 3.3 | 7.7 | 9 |
| Material C: Neoflon (registered trademark), FEP resin | 2.5 | 2.5 | 2.5 | |
| Material D: Tamanol (registered trademark), novolac type phenol resin | | | | 1 |
| Material E: Triton (registered trademark) X-100, surface active agent | 14 | 14 | 14 | |
| Solvent F: methanol | | | | 90 |
| Dispersion medium G: purified water | 75.8 | 75.8 | 75.8 | |

TABLE 2

| | | Example 1 | Example 2 | Example 3 | Example 4 | Example 5 |
|---|---|---|---|---|---|---|
| Carbon sheet | areal weight [g/m$^2$] | 43 | 43 | 43 | 43 | 43 |
| | thickness [μm] | 140 | 140 | 140 | 140 | 140 |
| | density [g/cm$^3$] | 0.29 | 0.29 | 0.29 | 0.29 | 0.29 |
| | surface layer density [g/cm$^3$] | 0.54 | 0.42 | 0.54 | 0.42 | 0.42 |
| | fluorine/carbon ratio on back surface fiber [−] | 0.030 | 0.030 | 0.030 | 0.030 | 0.020 |
| | fluorine/carbon ratio at through-thickness center [−] | 0.025 | 0.025 | 0.025 | 0.025 | 0.015 |
| | electrical resistance (2 MPa) [Ωcm] | 6.6 | 7.2 | 6.6 | 7.0 | 6.6 |
| | in-plane oxygen permeation coefficient [cc/min] | 86 | 130 | 95 | 125 | 103 |
| | simultaneous realization of in-plane oxygen permeation coefficient and electrical resistance | good | good | good | better | better |
| | and its index C | 0 | 8 | 9 | 15 | 17 |
| Internal porous body | areal weight [g/m$^2$] | 14 | 7 | 13 | 7 | 7 |
| | thickness [μm] | 22 | 11 | 20 | 10 | 11 |
| | porosity [%] | 69 | 69 | 69 | 69 | 69 |
| Microporous layer | areal weight [g/m$^2$] | 15 | 20 | 5 | 10 | 10 |
| Gas diffusion layer | areal weight [g/m$^2$] | 58 | 63 | 48 | 53 | 53 |
| | thickness [μm] | 175 | 177 | 165 | 170 | 170 |
| Power generation performance | output voltage (@ 30% RH 2A/cm$^2$) [V] | 0.40 | 0.41 | 0.41 | 0.43 | 0.43 |

TABLE 2-continued

| | | Example 6 | Example 7 | Example 8 | Example 9 | Example 10 |
|---|---|---|---|---|---|---|
| Carbon sheet | areal weight [g/m$^2$] | 43 | 43 | 43 | 43 | 47 |
| | thickness [μm] | 140 | 140 | 140 | 140 | 140 |
| | density [g/cm$^3$] | 0.29 | 0.29 | 0.30 | 0.30 | 0.29 |
| | surface layer density [g/cm$^3$] | 0.42 | 0.42 | 0.39 | 0.36 | 0.35 |
| | fluorine/carbon ratio on back surface fiber [−] | 0.015 | 0.005 | 0.005 | 0.005 | 0.005 |
| | fluorine/carbon ratio at through-thickness center [−] | 0.012 | 0.008 | 0.008 | 0.008 | 0.008 |
| | electrical resistance (2 MPa) [Ωcm] | 6.4 | 6.2 | 6.2 | 6.1 | 6.2 |
| | in-plane oxygen permeation coefficient [cc/min] | 107 | 95 | 100 | 100 | 105 |
| | simultaneous realization of in-plane oxygen permeation coefficient and electrical resistance | excellent | excellent | excellent | excellent | excellent |
| | and its index C | 33 | 33 | 38 | 44 | 43 |
| Internal porous body | areal weight [g/m$^2$] | 7 | 8 | 7 | 4 | 4 |
| | thickness [μm] | 11 | 12 | 16 | 21 | 21 |
| | porosity [%] | 69 | 69 | 80 | 90 | 91 |
| Microporous layer | areal weight [g/m$^2$] | 10 | 10 | 10 | 10 | 10 |
| Gas diffusion layer | areal weight [g/m$^2$] | 53 | 53 | 53 | 53 | 57 |
| | thickness [μm] | 170 | 170 | 170 | 170 | 170 |
| Power generation performance | output voltage (@ 30% RH 2A/cm$^2$) [V] | 0.44 | 0.45 | 0.45 | 0.47 | 0.47 |

| | | Example 11 | Example 12 | Example 13 | Example 14 | Example 15 |
|---|---|---|---|---|---|---|
| Carbon sheet | areal weight [g/m$^2$] | 44 | 44 | 43 | 43 | 43 |
| | thickness [μm] | 140 | 140 | 140 | 140 | 140 |
| | density [g/cm$^3$] | 0.29 | 0.30 | 0.29 | 0.29 | 0.29 |
| | surface layer density [g/cm$^3$] | 0.54 | 0.35 | 0.42 | 0.42 | 0.42 |
| | fluorine/carbon ratio on back surface fiber [−] | 0.030 | 0.005 | 0.030 | 0.030 | 0.030 |
| | fluorine/carbon ratio at through-thickness center [−] | 0.025 | 0.010 | 0.025 | 0.025 | 0.025 |
| | electrical resistance (2 MPa) [Ωcm] | 7.0 | 6.1 | 7.2 | 6.8 | 6.9 |
| | in-plane oxygen permeation coefficient [cc/min] | 110 | 100 | 126 | 108 | 113 |
| | simultaneous realization of in-plane oxygen permeation coefficient and electrical resistance | good | excellent | good | better | good |
| | and its index C | 0 | 44 | 4 | 10 | 9 |
| Internal porous body | areal weight [g/m$^2$] | 14 | 4 | 7 | 20 | 17 |
| | thickness [μm] | 22 | 21 | 10 | 30 | 26 |
| | porosity [%] | 69 | 90 | 69 | 69 | 69 |
| Microporous layer | areal weight [g/m$^2$] | 15 | 5 | 5 | 25 | 25 |
| Gas diffusion layer | areal weight [g/m$^2$] | 59 | 49 | 48 | 68 | 68 |
| | thickness [μm] | 175 | 170 | 170 | 180 | 180 |
| Power generation performance | output voltage (@ 30% RH 2A/cm$^2$) [V] | 0.40 | 0.47 | 0.40 | 0.42 | 0.42 |

| | | Comparative example 1 | Comparative example 2 | Comparative example 3 |
|---|---|---|---|---|
| Carbon sheet | areal weight [g/m$^2$] | 43 | 50 | 43 |
| | thickness [μm] | 140 | 140 | 140 |
| | density [g/cm$^3$] | 0.29 | 0.36 | 0.29 |
| | surface layer density [g/cm$^3$] | 0.54 | 0.67 | 0.54 |
| | fluorine/carbon ratio on back surface fiber [−] | 0.030 | 0.030 | 0.030 |
| | fluorine/carbon ratio at through-thickness center [−] | 0.025 | 0.025 | 0.025 |
| | electrical resistance (2 MPa) [Ωcm] | 7.2 | 6.4 | 7.7 |
| | in-plane oxygen permeation coefficient [cc/min] | 73 | 68 | 142 |
| | simultaneous realization of in-plane oxygen permeation coefficient and electrical resistance | low | low | low |
| | and its index C | −49 | −6 | −10 |
| Internal porous body | areal weight [g/m$^2$] | 21 | 20 | 2 |
| | thickness [μm] | 33 | 30 | 3 |
| | porosity [%] | 69 | 69 | 69 |
| Microporous layer | areal weight [g/m$^2$] | 15 | 15 | 13 |
| Gas diffusion layer | areal weight [g/m$^2$] | 58 | 65 | 56 |
| | thickness [μm] | 175 | 175 | 175 |
| Power generation performance | output voltage (@ 30% RH 2A/cm$^2$) [V] | 0.35 | 0.36 | 0.36 |

EXPLANATION OF NUMERALS

0, 0*a*, 0*b*: gas diffusion layer
1, 1*a*, 1*b*: carbon sheet
2: surface X (microporous layer side)
3: surface Y (separator side)
4: internal porous body
5, 5*a*, 5*b*: microporous layer
6, 6*a*, 6*b*: catalyst layer
7: electrolyte film
11: thickness of carbon sheet
12: thickness of internal porous body
13: thickness of microporous layer
21: mass flow controller

22: pipe A
23: valve A
24: pressure controller
25: valve B
26: pipe B
27: gas room A
28: gas diffusion layer
29: gas room B
30: pipe C
31: gas flow meter
32: sealer
33: nitrogen gas
W: width direction
D: depth direction

The invention claimed is:

1. A gas diffusion layer comprising a carbon sheet and a microporous layer disposed on at least one surface of the carbon sheet, and meeting the requirement "C is equal to or greater than 0", wherein:

C, which is referred to as "index for simultaneous realization of a required in-plane oxygen permeation coefficient and electrical resistance", is calculated by subtracting the product of B multiplied by 60 from A and adding 310 to the difference, A, which is referred to as "in-plane oxygen permeation coefficient", is the rate of oxygen permeation in an in-plane direction in a gas diffusion layer that occurs when a pressure of 0.5 MPa is applied in the through-plane direction to a surface of the gas diffusion layer to compress an arbitrarily selected region having a width of 10 mm and a depth of 3 mm in the gas diffusion layer, and B is the "electrical resistance" that occurs when the gas diffusion layer is compressed by applying a pressure of 2 MPa in the through-plane direction.

2. A gas diffusion layer as set forth in claim 1 comprising a carbon sheet and a microporous layer disposed on at least one surface of the carbon sheet wherein:

the carbon sheet has a region containing carbon fiber containing pores with a pore diameter of 10 μm or more and 100 μm or less and a region filled with an internal porous body with a pore diameter of 0.01 μm or more and less than 10 μm, and the internal porous body has an average thickness of 10 μm or more and 30 μm or less in the through-plane direction from the surface of the carbon sheet.

3. A gas diffusion layer as set forth in claim 1, wherein the internal porous body has an areal weight of 3 $g/m^2$ or more and 15 $g/m^2$ or less.

4. A gas diffusion layer as set forth in claim 2, wherein the carbon sheet contains a fluorine based water repellent agent and has a microporous layer on only one surface thereof, and the ratio of the number of fluorine atoms to that of carbon atoms on the carbon fiber on the other surface is 0.002 or more and 0.030 or less.

5. A gas diffusion layer as set forth in claim 1, wherein the internal porous body has a porosity of 80% or more and 95% or less.

6. A gas diffusion layer as set forth in claim 1, wherein, if the layer-like region ranging in the through-plane direction from the surface of the microporous layer in the carbon sheet to a position of 20 μm is defined as the surface layer, the surface layer of the carbon sheet has a density of 0.34 $g/cm^3$ or more and the overall density of the carbon sheet is 0.29 $g/cm^3$ or more and 0.33 $g/cm^3$ or less.

7. A membrane electrode assembly comprising a gas diffusion layer as set forth in claim 1.

8. A fuel cell comprising a membrane electrode assembly as set forth in claim 7.

* * * * *